US008212400B2

(12) United States Patent
Wu et al.

(10) Patent No.: US 8,212,400 B2
(45) Date of Patent: Jul. 3, 2012

(54) MULTI-RAIL POWER-SUPPLY SYSTEM

(75) Inventors: Wei-Chung Wu, Richardson, TX (US); Paul Vulpoiu, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 393 days.

(21) Appl. No.: 12/475,706

(22) Filed: Jun. 1, 2009

(65) Prior Publication Data

US 2009/0302683 A1 Dec. 10, 2009

Related U.S. Application Data

(60) Provisional application No. 61/130,627, filed on May 31, 2008.

(51) Int. Cl.
*H02J 1/00* (2006.01)

(52) U.S. Cl. ................. 307/54; 307/52; 307/53; 307/82

(58) Field of Classification Search .................... 307/52, 307/53, 54, 82
See application file for complete search history.

(56) References Cited

U.S. PATENT DOCUMENTS 6,008,549 A * 12/1999 Cooper et al. ................ 307/125
6,031,413 A * 2/2000 Mizoguchi .................... 327/538
7,594,127 B2 * 9/2009 Sutardja ........................ 713/300
2009/0039711 A1 * 2/2009 Williams ...................... 307/113
* cited by examiner

*Primary Examiner* — Hal Kaplan
(74) *Attorney, Agent, or Firm* — William B. Kempler; Wade J. Brady, III; Frederick J. Telecky, Jr.

(57) ABSTRACT

A multi-rail power-supply system provides power to circuitry requiring at least one additional rail between a high and a low-voltage rail. The system comprises a first power regulator that interconnects the high-voltage rail and an intermediate node and sets a first voltage rail that has a magnitude that is less than the high-voltage rail, wherein current that flows from the high-voltage rail is employed by a first set of peripheral circuitry prior to sinking through the first power regulator to the intermediate node. The system further comprises a second power regulator that interconnects the intermediate node and the low-voltage rail and sets a second voltage rail that has a magnitude that is greater than the low-voltage rail, wherein current that flows from the intermediate node is sourced by the second regulator and is employed by a second set of peripheral circuitry prior to flowing to the low-voltage rail.

20 Claims, 4 Drawing Sheets

MULTI-RAIL POWER-SUPPLY SYSTEM

RELATED APPLICATIONS

The present invention claims priority from U.S. Provisional Patent Application No. 61/130,627, filed May 31, 2008.

TECHNICAL FIELD

This invention relates to electronic circuits, and more specifically to a multi-rail power-supply system.

BACKGROUND

There is an ever increasing demand for power conversion and regulation circuitry to operate with increased efficiency and reduced power consumption to accommodate the continuous reduction in size and operating life of electronic devices. Half-bridge and full-bridge power stages are commonly employed as power delivery stages in applications where power conversion at high efficiencies is required. For example, half-bridge and full-bridge power stages can be employed in DC-DC power converters and class-D audio power amplifiers. In portable power integrated circuits (ICs), power conversion and power delivery to the load is required at exceptionally high efficiencies. As an example, limited battery power typically needs to be delivered to the load at minimal losses to prolong battery life.

Certain power providing applications, such as implemented in providing power to liquid crystal displays (LCDs), requires generating a plurality of voltages that occupy a range of magnitudes. However, a given transistor or operational amplifier (OP-AMP) in such power providing applications can have a very small feature size. A maximum operating voltage of the given transistor or OP-AMP can be very small in magnitude relative to the voltage that it is required to generate. As an example, an OP-AMP can be required to generate a voltage between 20 and 26 volts to power an LCD, which is a voltage that is significantly larger than that which can be tolerated to power the OP-AMP. Thus, level-shifting circuitry can be implemented to power or control the power providing devices.

SUMMARY

In accordance with an aspect of the invention, a multi-rail power-supply system provides power to circuitry requiring at least one additional rail between a high-voltage rail and a low-voltage rail. The system comprises a first power regulator that interconnects the high-voltage rail and an intermediate node and is configured to set a first voltage rail that has a magnitude that is less than the high-voltage rail, wherein current that flows from the high-voltage rail is employed by a first set of peripheral circuitry prior to sinking through the first power regulator to the intermediate node. The system further comprises a second power regulator that interconnects the intermediate node and the low-voltage rail and is configured to set a second voltage rail that has a magnitude that is greater than the low-voltage rail, wherein current that flows from the intermediate node is sourced by the second regulator and is employed by a second set of peripheral circuitry prior to flowing to the low-voltage rail.

In another aspect of the invention, a multi-rail power-supply system provides power to circuitry requiring at least one additional rail between a high-voltage rail and a low-voltage rail. The system comprises a plurality of power regulators arranged in series between a high-voltage rail and a low-voltage rail, the plurality of power regulators are configured to generate a plurality of voltage rails at a range of magnitudes between the high-voltage rail and the low-voltage rail, wherein current flows from the high-voltage rail through each of the plurality of power regulators in series to the low-voltage rail and is employed by a plurality of sets of peripheral circuitry each being disposed between different pairs of voltage rails. The system further comprises a current controller that is configured to source current to at least one of the plurality of power regulators and to sink current from at least one of the plurality of power regulators in response to varying load conditions of the plurality of circuits.

In yet a further aspect of the invention, a multi-rail power-supply system provides power to circuitry requiring at least one additional rail between a high-voltage rail and a low-voltage rail. The system includes a plurality of power regulators arranged in series between a high-voltage rail and a low-voltage rail. The plurality of power regulators can be configured to generate a plurality of voltage rails at a range of magnitudes between the high-voltage rail and the low-voltage rail. Current flows from the high-voltage rail through each of the plurality of power regulators in series to the low-voltage rail, such that at least a portion of the current is recycled through at least one of the plurality of power regulators.

DETAILED DESCRIPTION

The invention relates to electronic circuits, and more specifically to a multi-rail power-supply system that is configured to provide power to circuitry requiring at least one additional rail between a high-voltage rail and a low-voltage rail. The multi-rail power-supply system can include a plurality of power regulators that are configured to generate a plurality of voltage rails that occupy a range of magnitudes between a high-voltage rail and a low-voltage rail. The plurality of voltage rails can each provide power to circuits requiring different voltage levels, such as LCD driver circuits. Peripheral circuitry can employ the current flow from the high-voltage rail to the low-voltage rail. Specifically, a current can flow from the high-voltage rail to the low-voltage rail in a series path through each of the plurality of the power regulators and peripheral circuitry disposed between various pairs of power rails. Accordingly, at least a portion of the current flowing from the high-voltage rail to the low-voltage rail is recycled. In other words, because each set of the power regulators and associated peripheral circuitry is coupled in series between the high and low-voltage rails, and not in parallel, the current flow through the power regulators and associated peripheral circuitry is recycled by not flowing directly to the low-voltage rail from each individual set of the power regulators and associated peripheral circuitry. Therefore, power consumption of the power-supply system is conserved.

The peripheral circuitry to which power is provided by the plurality of voltages can have varying load conditions. As a result, the current requirements of each of the power regulators can likewise vary. Therefore, the multi-rail power-supply system can also include a current controller that can vary the current flow through each of the power regulators individually in response to the varying load conditions of the respective peripheral circuitry. Specifically, the current controller can be configured to sink current to at least one of the power regulators, such as those that generate lower voltage magnitudes, based on the respective at least one power regulator requiring a greater amount of current than the remaining one or more power regulators. Similarly, the current controller can be configured to source current to at least one of the power regulators, such as those that generate higher voltage magnitudes, based on the respective at least one power regulator requiring a greater amount of current than the remaining one or more power regulators.

Figure 1:
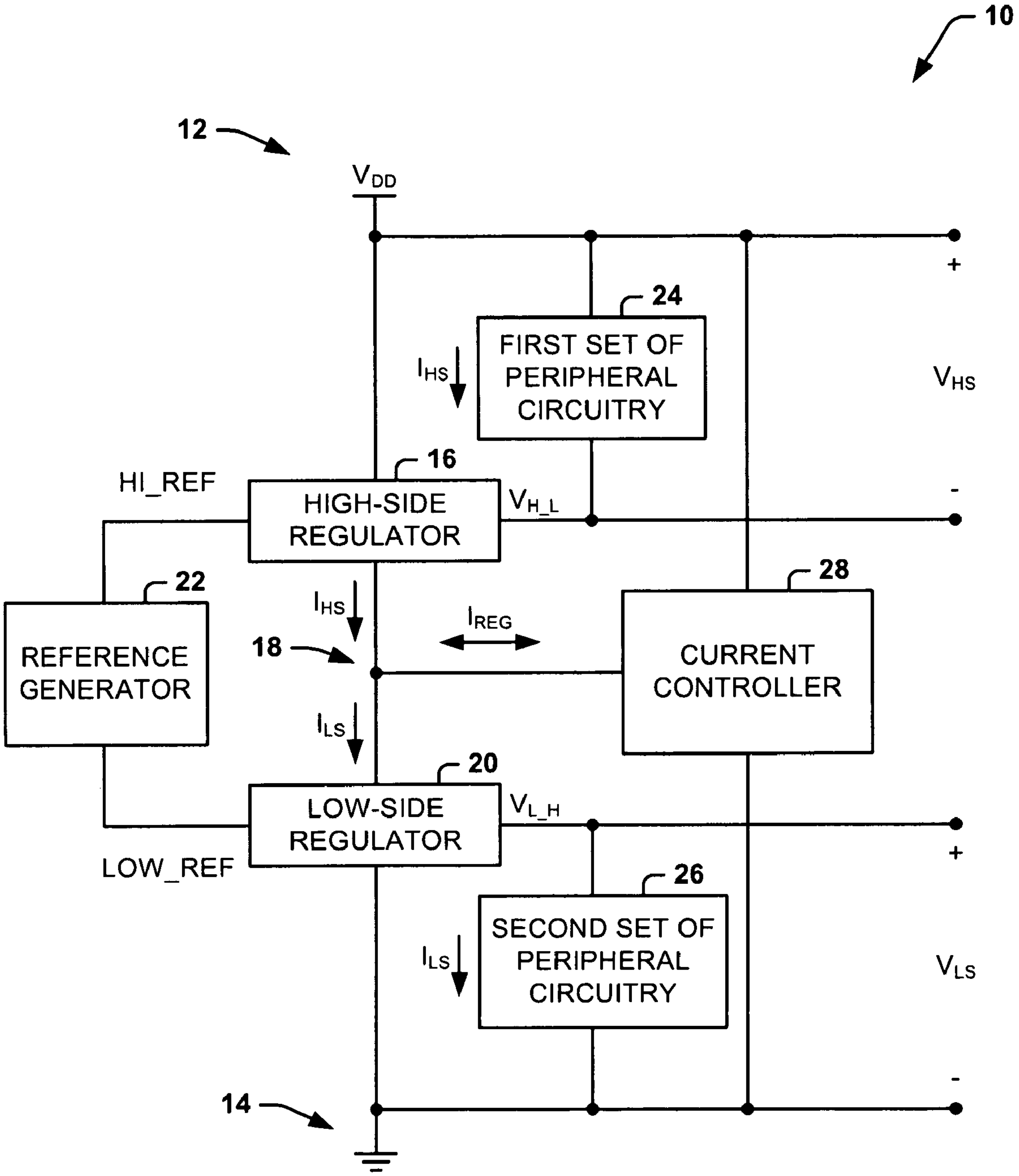
FIG. 1 illustrates an example of a multi-rail power-supply system in accordance with an aspect of the invention.

FIG. 1 illustrates an example of a multi-rail power-supply system 10 in accordance with an aspect of the invention. The multi-rail power-supply system 10 is configured to provide power to circuitry requiring at least one additional rail between a high-voltage rail and a low-voltage rail. The current that flows between the high-voltage rail and the low-voltage rail can be employed by peripheral circuitry. The power-supply system 10 is demonstrated as interconnecting a high-voltage rail 12, demonstrated as having a power voltage $V_{DD}$, and a low-voltage rail 14, demonstrated as ground. The power-supply system 10 is demonstrated in the example of FIG. 1 as generating two separate voltages, a high-side voltage $V_{HS}$ and a low-side voltage $V_{LS}$. As an example, the high-side voltage $V_{HS}$ and the low-side voltage $V_{LS}$ can be substantially constant and can be approximately equal to each other. For example, the high-side voltage $V_{HS}$ and the low-side voltage $V_{LS}$ can each have a magnitude of approximately 6 volts. As demonstrated in greater detail below, the high-side voltage $V_{HS}$ and the low-side voltage $V_{LS}$ can each provide power to separate peripheral circuits, respectively.

The power-supply system 10 includes a high-side power regulator 16 that interconnects the high-voltage rail 12 and an intermediate node 18 and a low-side power regulator 20 that interconnects the intermediate node 18 and the low-voltage rail 14. The high-side power regulator 16 is configured to generate a first voltage rail $V_{H\_L}$ that is referenced to the power voltage $V_{DD}$ to generate the high-side voltage $V_{HS}$. Specifically, the first voltage rail $V_{H\_L}$ is generated at a specific reference that is a predetermined magnitude (e.g., 6 volts) less than the power voltage $V_{DD}$. Therefore, even if the magnitude of the power voltage $V_{DD}$ changes, such as based on the power voltage $V_{DD}$ being provided from a battery, the magnitude of the high-side voltage $V_{HS}$ can remain substantially constant. Similarly, the low-side power regulator 20 is configured to generate a second voltage rail $V_{L\_H}$ that is referenced to ground to generate the low-side voltage $V_{LS}$. Specifically, the second voltage rail $V_{L\_H}$ is generated at a specific reference that is a predetermined magnitude (e.g., 6 volts) greater than the ground (i.e., zero). A reference generator circuit 22 provides reference signals HI_REF and LOW_REF to the high and low-side power regulators 16 and 20, respectively, for the high and low-side power regulators 16 and 20 to generate the respective first and second voltage rails $V_{H\_L}$ and $V_{L\_H}$.

The power-supply system 10 also includes a first set of peripheral circuitry 24 and a second set of peripheral circuitry 26. The first and second set of peripheral circuitry 24 and 26 can each be circuits that require power at the same voltage limits (e.g., 6 volts). As an example, each of the first and second set of peripheral circuitry 24 and 26 can include fragile circuit components, such as transistors and/or operational amplifiers (OP-AMPs) that can be damaged by large changes or shifts in voltage. As an example, the first and second set of peripheral circuitry 24 and 26 can be gate-drivers for a switching power regulator, op-amps, digital gates, field effect transistors, liquid crystal display (LDC) driver circuits or other circuitry that cannot operate beyond a maximum voltage without being damaged.

To reduce power consumption waste, the multi-rail power-supply system 10 can also provide the current that normally is wasted for employment by the first and second set of peripheral circuits. Specifically, as demonstrated in the example of FIG. 1, the high and low-side power regulators 16 and 20 are coupled together via the intermediate node 18. In the example of FIG. 1, the first set of peripheral circuitry 24 and the high-side power regulator 16 conduct a high-side current $I_{HS}$ and the second set of peripheral circuitry 26 and the low-side power regulator 20 conduct a low-side current $I_{LS}$. In this manner, the current is employed to drive the high-side and low-side regulators can be employed to power the first and second set of peripheral circuitry 24 and 26.

Because the low-side power regulator 20 interconnects the intermediate node 18 and the low-voltage rail 14, at least a portion of the high-side current $I_{HS}$ is recycled as the low-side current $I_{LS}$, instead of being conducted directly to ground. In other words, instead of current flowing through each of the first and second set of peripheral circuitry 24 and 26 and the high and low-side power regulators 16 and 20 from the high-voltage rail 12 to the low-voltage rail 14 via separate current paths, current flows from the high-voltage rail 12 to the low-voltage rail 14 via a series current path through each of the first and second set of peripheral circuitry 24 and 26 and the high and low-side power regulators 16 and 20.

The first and second set of peripheral circuitry 24 and 26 can have varying load conditions with respect to each other. As an example, switching and/or other operations within the first and second set of peripheral circuitry 24 and 26 can vary the current requirements of the first and second set of peripheral circuitry 24 and 26 relative to each other. Therefore, the power-supply system 10 includes a current controller 28 that is configured to source or sink a regulation current IREG to or from the intermediate node 18. Specifically, if the first set of peripheral circuitry 24 requires more current than the second set of peripheral circuitry 26, the current controller 28 sinks the excess current (i.e., the difference in current required between the first and second set of peripheral circuitry 24 and 26) from the intermediate node 18 to ground. Similarly, if the second set of peripheral circuitry 26 requires more current than the first set of peripheral circuitry 24, the current controller 28 sources the additional current (i.e., the difference in current required between the first and second set of peripheral circuitry 24 and 26) from the high-voltage rail 12 to the intermediate node 18. Accordingly, the power-supply system 10 can maintain efficient power consumption based on recycling current, even upon varying load conditions of the first and second set of peripheral circuitry 24 and 26.

It is to be understood that the multi-rail power-supply system 10 is not intended to be limited to the example of FIG. 1. As an example, the low-voltage rail 14 need not be ground, but could instead have a magnitude that is greater or less than ground. As another example, the high and low-side power regulators 16 and 18 can be provided a reference in any of a variety of other ways than the common reference generator circuit 22. Furthermore, the current controller 28 can be configured as two or more separate components to source and/or sink the regulation current IREG to and/or from the intermediate node 18, respectively. Accordingly, the power-supply system 10 can be configured in any of a variety of ways.

Figure 2:
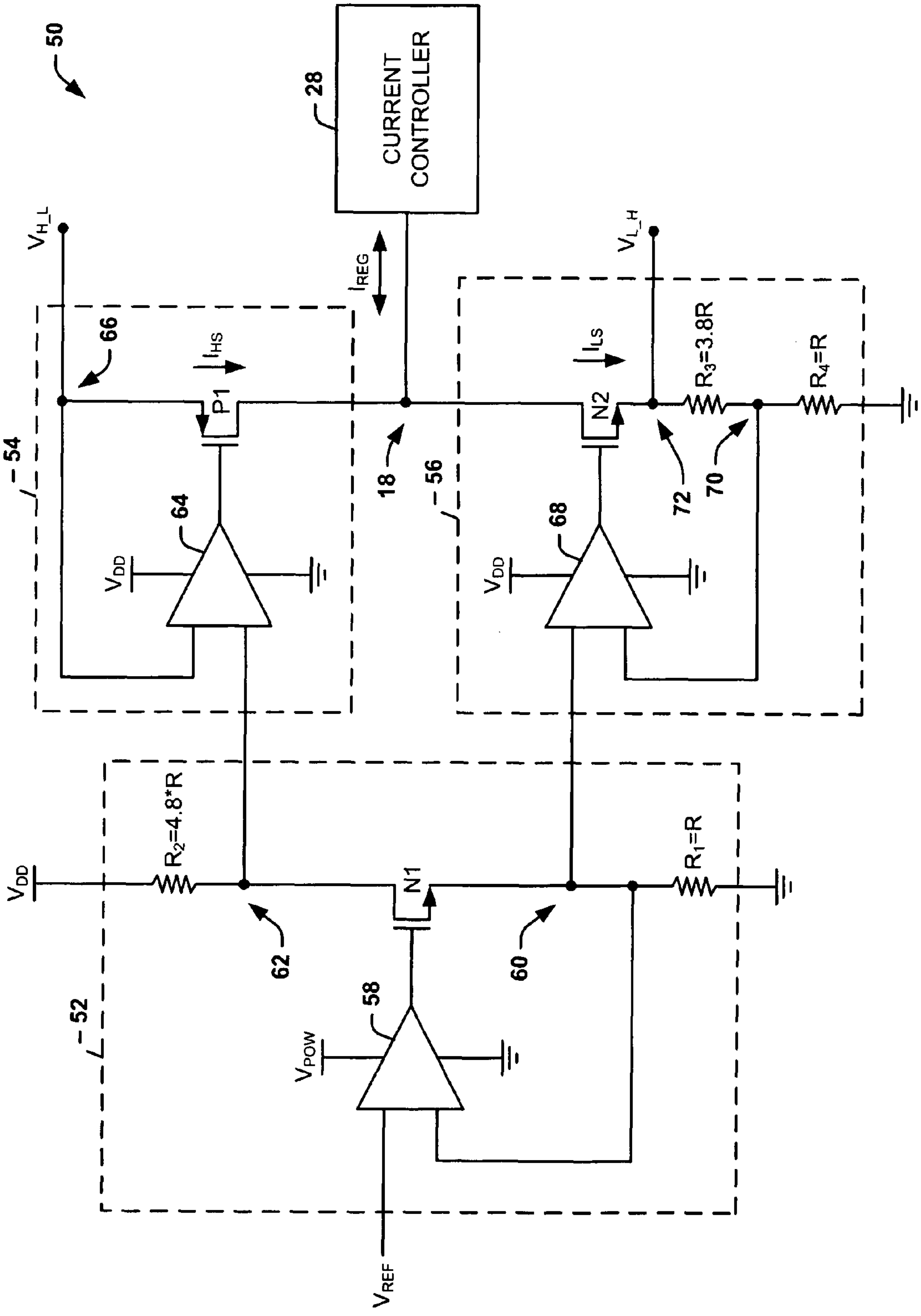
FIG. 2 illustrates an example of a power regulation system in accordance with an aspect of the invention.

FIG. 2 illustrates an example of a power regulation system 50 in accordance with an aspect of the invention. The power regulation system 50 includes a reference generator circuit 52, a high-side power regulator 54, and a low-side power regulator 56. As an example, the reference generator circuit 52 can correspond to the reference generator 22 and the high and low-side power regulators 54 and 56 can each correspond to the high and low-side power regulators 16 and 20, respectively. Therefore, reference is to be made to the example of FIG. 1 in the following description of the example of FIG. 2.

The reference generator circuit 52 includes a differential amplifier 58 that is powered by a voltage VPOW relative to ground. The voltage VPOW can be, for example, 5 volts. The differential amplifier 58 receives a reference voltage VREF at a first input and has a second input that is coupled to a reference node 60. As an example, the reference voltage VREF can be approximately 1.25 volts. The output of the differential amplifier 58 is coupled to a gate of an N-type field effect transistor (FET) N1. The N-FET N1 interconnects the reference node 60 at a source and a reference node 62 at a drain. Therefore, the reference generator circuit 52 is configured as a low drop-out (LDO) circuit. In addition, a resistor $R_1$ having a resistance "R" interconnects the reference node 60 and the low-voltage rail 14, and a resistor $R_2$ having a resistance "4.8 R" interconnects the reference node 62 and the high-voltage rail 12. Therefore, the reference node 60 has a voltage that is approximately equal to the reference voltage VREF and the reference node 62 has a voltage that is approximately equal to the voltage $V_{H\_L}$. Accordingly, the voltages $V_{H\_L}$ and $V_{L\_H}$ correspond to the reference signals HI_REF and LOW_REF, respectively, in the example of FIG. 1.

The high-side power regulator 54 includes a differential amplifier 64 that is powered by the power voltage $V_{DD}$ and ground. The differential amplifier 64 is coupled to the reference node 62 at a first input and is coupled to an output node 66 at a second input. The output of the differential amplifier 64 is coupled to the gate of a P-FET P1 that interconnects the output node 66 and the intermediate node 18. Therefore, the high-side power regulator 54 is likewise configured as an LDO circuit to provide the voltage $V_{H\_L}$ at the output node 66. In the example of FIG. 2, the voltage $V_{H\_L}$ can thus have a magnitude of approximately $V_{DD}$ minus 6 volts.

The low-side power regulator 56 includes a differential amplifier 68 that is powered by the power voltage $V_{DD}$ and ground. The differential amplifier 68 is coupled to the reference node 60 at a first input and is coupled to a reference node 70 at a second input. The output of the differential amplifier 68 is coupled to the gate of an N-FET N2 that interconnects the intermediate node 18 and an output node 72. A resistor $R_3$ having a resistance of "3.8 R" interconnects the output node 72 and the reference node 70, and a resistor $R_4$ having a resistance of "R" interconnects the reference node 70 and the low-voltage rail 14. Therefore, the low-side power regulator 56 is likewise configured as an LDO circuit to provide the voltage $V_{L\_H}$ at the output node 72. In the example of FIG. 2, the voltage $V_{L\_H}$ can thus have a magnitude of approximately 6 volts.

As demonstrated in the example of FIG. 2, the high-side current $I_{HS}$ flows through the P-FET P1 and the low-side current $I_{LS}$ flows through the N-FET N2. Specifically, the high-side current $I_{HS}$ flows from the high-voltage reference circuit 24 to the high-side power regulator 54 and the low-side current $I_{LS}$ flows from the low-side power regulator 56 to the low-side reference circuit 26. As described above, the current requirements of the first and second set of peripheral circuitry 24 and 26 can vary. Therefore, the example of FIG. 2 demonstrates the current controller 28 coupled to the intermediate node 18. Accordingly, the current controller 28 can sink a portion of the high-side current $I_{HS}$ from the intermediate node 18 or source additional current to the low-side current $I_{LS}$ based on the variation in load conditions of the first and second set of peripheral circuitry 24 and 26.

It is to be understood that the power regulation system 50 is not intended to be limited to the example of FIG. 2. As an example, the reference generator circuit 52 and the high and low-side power regulators 54 and 56 are not limited to being configured as LDO power regulators, but can instead be configured as other types of power regulators in generating the reference signals as well as the voltages $V_{H\_L}$ and $V_{L\_H}$. Accordingly, the power regulation system 50 can be configured in any of a variety of ways.

Figure 3:
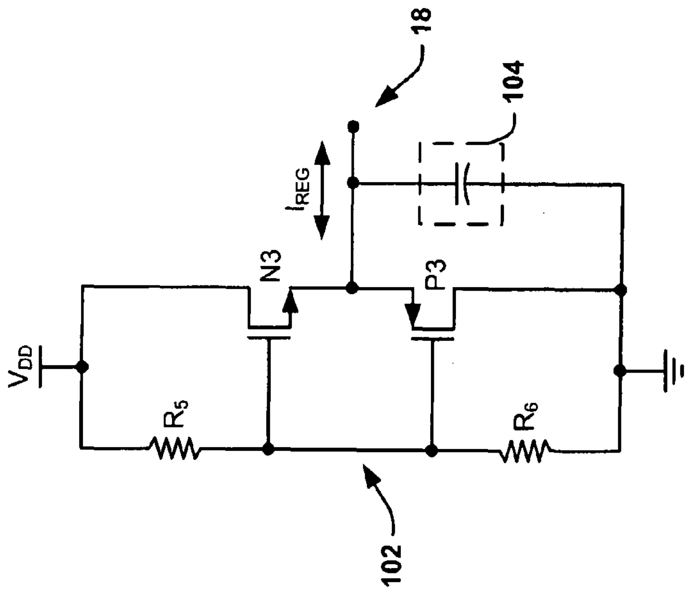
FIG. 3 illustrates an example of a current controller for compensating for varying load conditions of the system of FIG. 1 in accordance with an aspect of the invention.

FIG. 3 illustrates an example of a current controller 100 for compensating for varying load conditions of the system of FIG. 1 in accordance with an aspect of the invention. The current controller 1 00 can correspond to the current controller 28 in the example of FIG. 1. Therefore, reference is to be made to the example of FIG. 1 in the following description of the example of FIG. 3.

The current controller 100 is demonstrated as interconnecting the high-voltage rail 12 and the low-voltage rail 14. A first resistor $R_5$ interconnects the high-voltage rail 12 and a bias node 102 and a second resistor $R_6$ interconnects the bias node 102 and the low-voltage rail 14. As an example, the first and second resistors R5 and R6 can have very large resistance magnitudes (e.g., in the kΩ or MΩ range) to substantially mitigate a quiescent current flow from the high-voltage rail 12 to the low-voltage rail 14. The bias node 102 can therefore have a fixed voltage.

The current controller 100 also includes an N-FET N3 that interconnects the high-voltage rail 12 and the intermediate node 18 and a P-FET P3 that interconnects the intermediate node 18 and the low-voltage rail 14. The N-FET N3 and the P-FET P3 are each configured in a source-follower arrangement. Specifically, the N-FET N3 and the P-FET P3 are configured to activate in response to changes in voltage at the intermediate node 18. As an example, upon the voltage at the intermediate node 18 decreasing, the N-FET N3 activates to source the regulation current IREG to the intermediate node 18 to satisfy the increased current demand of the low-voltage reference circuit 26. As another example, upon the voltage at the intermediate node 18 increasing, the P-FET P3 activates to sink the regulation current IREG from the intermediate node 18 to alleviate the additional current that is required by the first set of peripheral circuitry 24. In the event that the current requirements of the first and second set of peripheral circuitry 24 and 26 are approximately the same, then neither the N-FET N3 nor the P-FET P3 are activated. As a result, the current controller 100 sources or sinks the regulation current IREG to or from the intermediate node upon a current requirement mismatch between the first and second set of peripheral circuitry 24 and 26.

The current controller 100 further includes an energy storage component 104 that is coupled to the node 18. As demonstrated in the example of FIG. 3, the energy storage component 104 is demonstrated as a capacitor, but it is to be understood that the energy storage component 104 could be any of a variety of other energy storage devices, such as a battery. The energy storage component 104 is configured to store some or all of the current that is sunk to the intermediate node 18 from the first set of peripheral circuitry 24, and to discharge some or all of the stored energy from the intermediate node 18 as the sourced current to the second set of peripheral circuitry 26. In other words, instead of the current simply being sourced or sunk by the current controller 100 via the N-FET N3 and the P-FET P3, respectively, part or all of the current could be stored and then resupplied. For example, if the first set of peripheral circuitry 24 requires more current, the energy storage component 104 becomes charged. The voltage at the intermediate node 18 moves as a result, but if it moves too much, then the excess current is discharged to ground as explained above. With a large enough capacitance/storage capacity of the energy storage component 104, the voltage at the intermediate node 18 does not move. Then, if the second set of peripheral circuitry 26 requires more current, it can draw the extra current from the energy stored in the energy storage capacity 104, thus discharging the stored energy. As a result, the energy storage component 104 can further increase the efficiency of the power-supply system 10.

Figure 4:
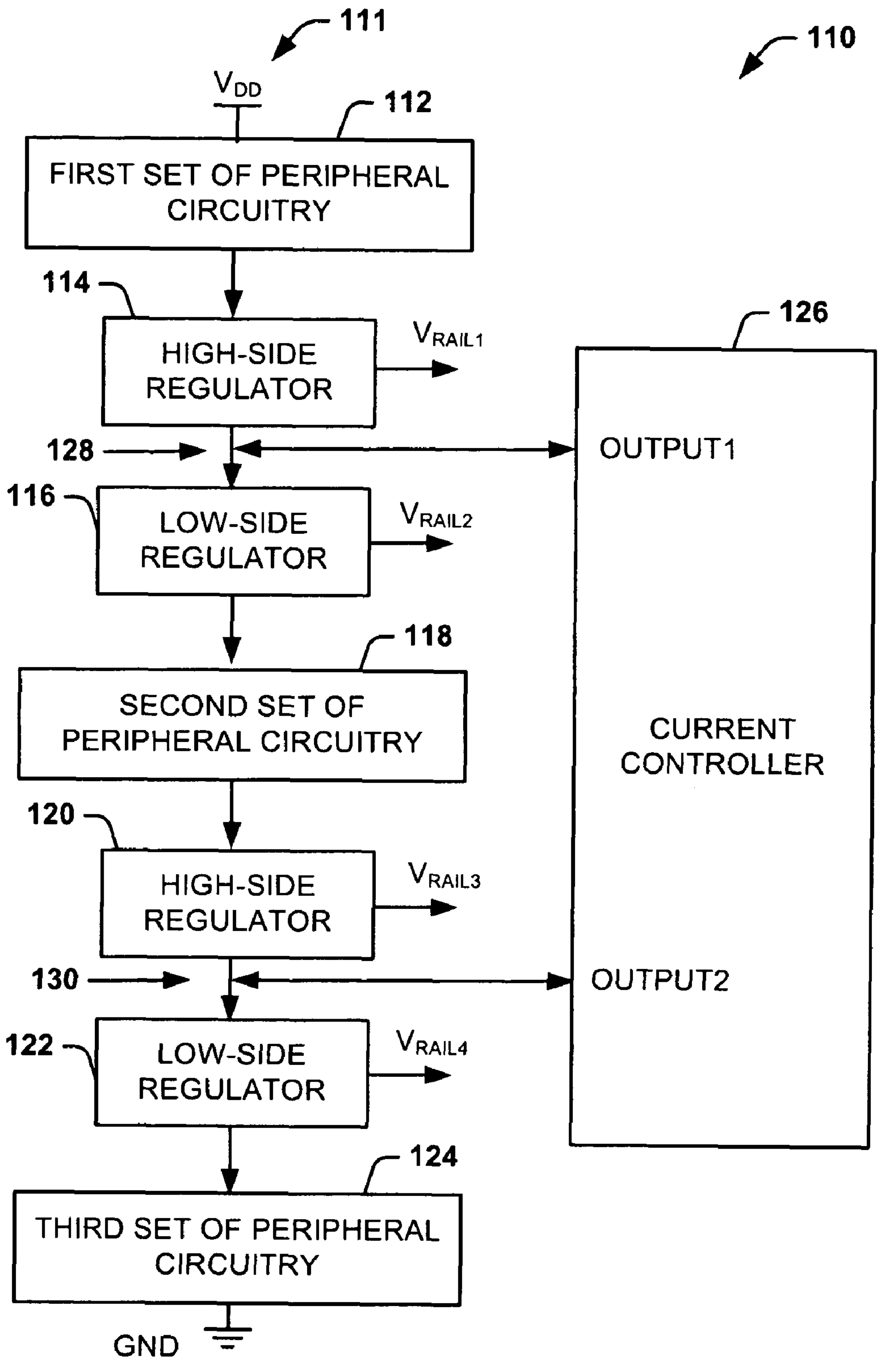
FIG. 4 illustrates another example of a multi-rail power-supply system in accordance with an aspect of the invention.

It is to be appreciated that the present invention is not limited to a two-stage device (i.e., providing power to two different sets of peripheral circuits). A multi-rail power-supply system can be configured with N number of stages for powering N different sets of peripheral circuits, where N is an integer greater than one. FIG. 4 illustrates another example of a multi-rail power-supply system 110 in accordance with an aspect of the invention. The multi-rail power-supply system 110 is a three stage system such that current that flows from a high-voltage rail 111, demonstrated at the power voltage $V_{DD}$, can flow in series through three different sets of peripheral circuits that provide four different voltage rails between a high-voltage rail ($V_{DD}$) and a low-voltage rail (GND). A first set of peripheral circuitry 112 is coupled in between $V_{DD}$ and a first high-side regulator 114 such that the first set of peripheral circuitry 112 can employ current sinking through the first high-side regulator 114. The first high-side regulator 114 provides a first voltage rail ($V_{RAIL1}$) that is less than $V_{DD}$ and is coupled to a first intermediate node 128. A first low-side regulator 116 is coupled to the first intermediate node 128 and a second set of peripheral circuitry 118 and provides a second voltage rail ($V_{RAIL2}$) that is less than the first voltage rail. The second set of peripheral circuit 118 can employ the current sourced by the first low-side regulator 116.

A second high-side regulator 120 is coupled to the second set of peripheral circuitry 118 and a second intermediate node 130 and provides a third voltage rail ($V_{RAIL3}$) that is less than the second voltage rail. A second low-side regulator 122 is coupled to the second intermediate node 130 and a third set of peripheral circuitry 124 and provides a fourth voltage rail ($V_{RAIL4}$) that is less than the third voltage rail but greater than ground. The third set of peripheral circuitry 1 24 can employ the current sourced from the second low-side regulator 122. A current controller 126 is coupled to the first intermediate 128 to source and sink current upon a current requirement mismatch between the first high-side regulator 114 and first low-side regulator 116. The current controller 126 is also coupled to the second intermediate node 130 to source and sink current upon a current requirement mismatch between the second high-side regulator 120 and the second low-side regulator 122.

Based on the configuration of the multi-rail power-supply system 110, current that flows from the high-voltage rail 111 to ground is thus recycled through multi-rail power-supply system 110. In other words, at least a portion of the current that flows from the high-voltage rail 111 to ground flows in series through each of the power regulators 116, 118, 120, and 122, as well as the sets of peripheral circuitry 112, 118, and 124. Thus, the current is recycled instead of being wasted by flowing to ground from each of the individual power regulators 116, 118, 120, and 122 and/or sets of peripheral circuitry 112, 118, and 124. Accordingly, power consumption of the multi-rail power-supply system 110 is conserved.

Figure 5:
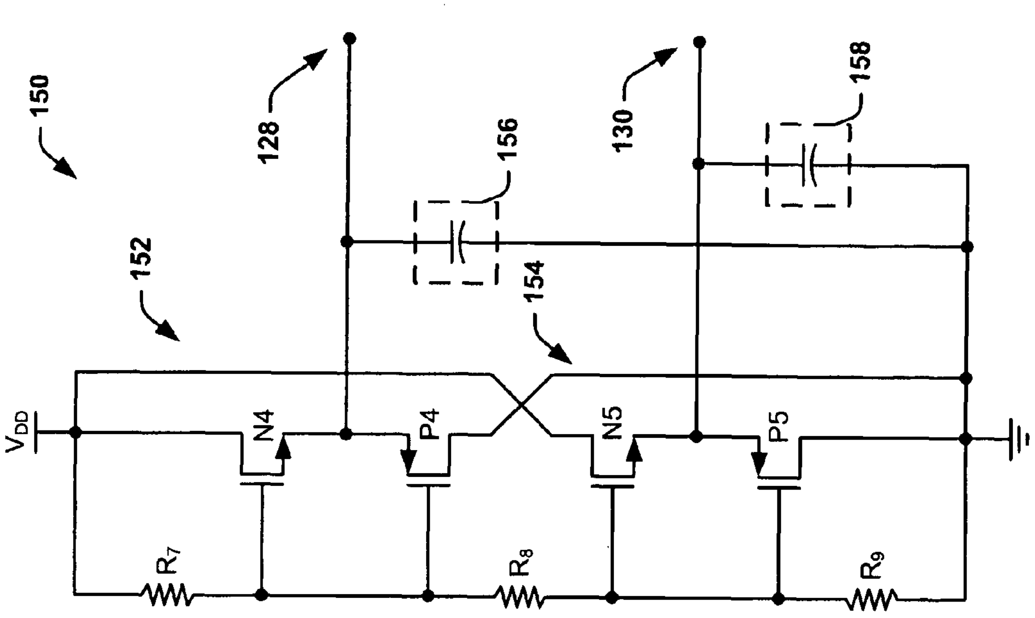
FIG. 5 illustrates another example of a current controller for compensating for varying load conditions of the system of FIG. 4 in accordance with an aspect of the invention.

FIG. 5 illustrates an example of a current controller 150 for compensating for varying load conditions of the system 110 of FIG. 4 in accordance with an aspect of the invention. The current controller 100 can correspond to the current controller 126 in the example of FIG. 4. Therefore, reference is to be made to the example of FIG. 4 in the following description of the example of FIG. 5. The current controller 150 employs two source follower arrangements similar to that illustrated in FIG. 3. A first source follower arrangement 152 is formed from N-FET N4 coupled to P-FET P4 via the first intermediate node 128 and resistors $R_7$ and $R_8$. A second source follower arrangement 154 is formed from N-FET N5 coupled to P-FET P5 via the second intermediate node 130 and resistors $R_8$ and $R_9$. Both the first and second source follower arrangements 152 and 154 are coupled between the high-voltage rail ($V_{DD}$) and the low-voltage rail (GND). Furthermore, the current controller 150 includes a first energy storage component 156 and a second energy storage component 158, which can be configured similar to as described above regarding the energy storage component 104 in the example of FIG. 3.

It is to be appreciated that the multi-rail supply system and the current controller illustrated in FIGS. 1-5 can be expanded to N stages that allow peripheral circuits to employ current that is utilized to provide power to the multi-rail power-supply system.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A multi-rail power-supply system for providing power to circuitry requiring at least one additional rail between a high-voltage rail and a low-voltage rail, the system comprising:

a first power regulator that interconnects the high-voltage rail and an intermediate node and is configured to set a first voltage rail that has a magnitude that is less than the high-voltage rail, wherein current that flows from the high-voltage rail is employed by a first set of peripheral circuitry prior to sinking through the first power regulator to the intermediate node; and a second power regulator that interconnects the intermediate node and the low-voltage rail and is configured to set a second voltage rail that has a magnitude that is greater than the low-voltage rail, wherein current that flows from the intermediate node is sourced by the second regulator and is employed by a second set of peripheral circuitry prior to flowing to the low-voltage rail.

2. The system of claim 1, wherein the high-voltage rail, the low-voltage rail, the first voltage rail and the second voltage rail are employed to provide different voltage levels to circuitry that requires multi-rail supply voltages.

3. The system of claim 2, wherein the circuitry that requires multi-rail supply voltages is associated with driving a liquid crystal display (LCD).

4. The system of claim 1, further comprising a current controller that is coupled to the intermediate node and is configured to one of sink current from and source current to the intermediate node upon a current requirement mismatch between the first and second power regulators.

5. The system of claim 4, wherein the first set of peripheral circuitry and the second set of peripheral circuitry each have variable load resistances that are determinative of whether the current controller one of sinks and sources current.

6. The system of claim 4, wherein the current controller comprises an energy storage component configured to store energy associated with at least a portion of the current that is sourced to the intermediate node and to discharge the stored energy as at least a portion of the current that is sunk from the intermediate node.

7. The system of claim 4, wherein a current controller comprises a pair of transistors that are arranged as a source follower.

8. The system of claim 7, wherein the current controller further comprises a first resistor interconnecting the high-voltage rail and a bias node and a second resistor interconnecting the low-voltage rail and the bias node, the pair of transistors each comprising a bias terminal coupled to the bias node.

9. The system of claim 7, wherein the pair of transistors comprises a first transistor interconnecting the high-voltage rail and the intermediate node and a second transistor interconnecting the low-voltage rail and the intermediate node, the first transistor being activated to source current to the second power regulator upon the second power regulator requiring more current than the first power regulator and the second transistor being activated to sink current from the first power regulator upon the first power regulator requiring more current than the second power regulator.

10. The system of claim 1, wherein the first and second power regulators are each configured as low drop-out (LDO) power regulators.

11. The system of claim 1, further comprising a reference generator circuit configured to set a reference voltage magnitude that sets a difference between the high-voltage rail and the first voltage and a difference between the second voltage and the low-voltage rail to be approximately equal.

12. A multi-rail power-supply system for providing power to circuitry requiring at least one additional rail between a high-voltage rail and a low-voltage rail, the system comprising:

a plurality of power regulators arranged in series between a high-voltage rail and a low-voltage rail, the plurality of power regulators being configured to generate a plurality of voltage rails at a range of magnitudes between the high-voltage rail and the low-voltage rail, wherein current that flows from the high-voltage rail through each of the plurality of power regulators in series to the low-voltage rail is employed by a plurality of sets of peripheral circuitry each being disposed between different pairs of voltage rails; and a current controller that is configured to source current to at least one of the plurality of power regulators and to sink current from at least one of the plurality of power regulators in response to varying load conditions of the plurality of circuits.

13. The system of claim 12, wherein the current controller is coupled to a first intermediate node that connects a first one and a second one of the plurality of power regulators and a second intermediate node that connects a third one and a fourth one of the plurality of power regulators, the current controller being configured to source current to at least one of the second one and the fourth one of the plurality of power regulators and to sink current from at least one of the first one and third one of the plurality of power regulators in response to varying load conditions of the plurality of circuits.

14. The system of claim 13, wherein the current controller comprises:

a first pair of transistors that are arranged as a source follower to source current to the second one of the plurality of power regulators and to sink current from the first one of the plurality of power regulators; and a second pair of transistors that are arranged as a source follower to source current to the fourth one of the plurality of power regulators and to sink current from the third one of the plurality of power regulators.

15. The system of claim 14, wherein the current controller further comprises:

a first resistor interconnecting the high-voltage rail and a first bias node;

a second resistor interconnecting the low-voltage rail and a second bias node; and a third resistor interconnecting the first and second bias nodes, the first pair of transistors and the second pair of transistors each comprising bias terminals coupled to the first bias node and the second bias node, respectively.

16. The system of claim 12, wherein the current controller comprises a first transistor interconnecting the high-voltage rail and an intermediate node and a second transistor interconnecting the low-voltage rail and the intermediate node, the intermediate node being coupled to a first one and a second one of the plurality of power regulators, the first transistor being activated to source current to the first one of the plurality of power regulators upon the second power regulator requiring more current than the first power regulator and the second transistor being activated to sink current from the first power regulator upon the first power regulator requiring more current than the second power regulator.

17. The system of claim 12, wherein the current controller comprises an energy storage component configured to store energy associated with at least a portion of the current that is sourced to the intermediate node and to discharge the stored energy as at least a portion of the current that is sunk from the intermediate node.

18. A multi-rail power-supply system for providing power to circuitry requiring at least one additional rail between a high-voltage rail and a low-voltage rail, the system comprising a plurality of power regulators arranged in series between a high-voltage rail and a low-voltage rail, the plurality of power regulators being configured to generate a plurality of voltage rails at a range of magnitudes between the high-voltage rail and the low-voltage rail, wherein current flows from the high-voltage rail through each of the plurality of power regulators in series to the low-voltage rail, such that at least a portion of the current is recycled through at least one of the plurality of power regulators.

19. The system of claim 18, wherein the current is employed by a plurality of sets of peripheral circuitry each being disposed between different pairs of the plurality of voltage rails.

20. The system of claim 19, further comprising a current controller that is configured to source current to at least one of the plurality of power regulators and to sink current from at least one of the plurality of power regulators in response to varying load conditions of the plurality of circuits.

* * * * *